(12) United States Patent
Kounnas

(10) Patent No.: US 9,462,333 B2
(45) Date of Patent: Oct. 4, 2016

(54) METHOD FOR PROCESSING MULTIMEDIA STREAMS

(75) Inventor: Michael K. Kounnas, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 857 days.

(21) Appl. No.: 12/891,681

(22) Filed: Sep. 27, 2010

(65) Prior Publication Data

US 2012/0076155 A1 Mar. 29, 2012

(51) Int. Cl.
*H04N 21/438* (2011.01)
*H04N 21/442* (2011.01)
*H04N 21/45* (2011.01)

(52) U.S. Cl.
CPC .......... *H04N 21/438* (2013.01); *H04N 21/442* (2013.01); *H04N 21/4516* (2013.01)

(58) Field of Classification Search
CPC ........ G06F 15/16; H04J 3/24; H04N 21/438; H04N 21/442; H04N 21/4516
USPC ................................................ 370/231, 465
See application file for complete search history.

(56) References Cited

U.S. PATENT DOCUMENTS

| 5,592,671 | A | | 1/1997 | Hirayama |
| 5,703,877 | A | * | 12/1997 | Nuber et al. ............. 370/395.64 |
| 5,946,298 | A | * | 8/1999 | Okuyama ..................... 370/232 |
| 6,438,135 | B1 | * | 8/2002 | Tzeng .......................... 370/412 |
| 6,445,679 | B1 | * | 9/2002 | Taniguchi et al. ............ 370/232 |
| 6,747,991 | B1 | | 6/2004 | Hemy et al. |
| 6,793,625 | B2 | | 9/2004 | Cavallaro et al. |
| 7,457,243 | B2 | * | 11/2008 | Meggers et al. ............. 370/230 |
| 7,647,619 | B2 | * | 1/2010 | Kashima ....................... 725/146 |
| 8,213,413 | B2 | * | 7/2012 | Poetker et al. ............... 370/352 |
| 2001/0022789 | A1 | | 9/2001 | Huang et al. |
| 2002/0007416 | A1 | * | 1/2002 | Putzolu ........................ 709/231 |
| 2002/0131443 | A1 | | 9/2002 | Robinett et al. |
| 2002/0181506 | A1 | * | 12/2002 | Loguinov ..................... 370/473 |
| 2003/0043923 | A1 | | 3/2003 | Zhang et al. |
| 2006/0133513 | A1 | * | 6/2006 | Kounnas ................. 375/240.26 |

FOREIGN PATENT DOCUMENTS

| CN | 1475009 A | 2/2004 |
| CN | 1509094 A | 6/2004 |
| CN | 1933465 A | 3/2007 |
| EP | 1111796 A1 | 6/2001 |

(Continued)

OTHER PUBLICATIONS

Office Action received for Chinese Patent Application No. 200510119152.4, mailed on Mar. 13, 2009, 20 pages of Office Action including 13 pages of English Translation.

(Continued)

*Primary Examiner* — Joe Chacko
(74) *Attorney, Agent, or Firm* — International IP Law Group, P.L.L.C.

(57) ABSTRACT

A method, machine readable medium, system, and device are disclosed. In one embodiment the method comprises determining whether one or more components that comprise a multimedia stream require real-time processing, if at least one of the one or more components require real-time processing, assigning the one or more components that require real-time processing to one or more real-time processes, and assigning any remaining components to one or more non-real-time processes.

13 Claims, 15 Drawing Sheets

(56) References Cited

FOREIGN PATENT DOCUMENTS

| EP | 1343322 A1 | 9/2003 |
|---|---|---|
| EP | 1432183 A2 | 6/2004 |
| JP | 10-240548 A | 9/1998 |
| JP | 2003-264592 A | 9/2003 |
| JP | 2003-533712 A | 11/2003 |
| WO | 01/77888 A2 | 10/2001 |
| WO | 0177888 A2 | 10/2001 |
| WO | 02/28108 A2 | 4/2002 |
| WO | 03/087961 A1 | 10/2003 |
| WO | 03087961 A1 | 10/2003 |
| WO | 2006/069122 A2 | 6/2006 |
| WO | 2006/069122 A3 | 9/2006 |

OTHER PUBLICATIONS

Office Action received for Chinese Patent Application No. 200510119152.4, mailed on Sep. 2, 2010, 10 pages of Office Action including 6 pages of English Translation.

Office Action received for Chinese Patent Application No. 200510119152.4, mailed on Jan. 31, 2012, 17 pages of Office Action including 11 pages of English Translation.

Office Action received for received for Japanese Patent Application No. 2007-548413, mailed on Nov. 9, 2009, 9 pages of Office Action including 4 pages of English Translation.

Office Action received for Japanese Patent Application No. 2007-548413, mailed on Jun. 7, 2010, 8 pages of Office Action including 4 pages of English Translation.

Office Action recieved for European Patent Application No. 05554327.0, mailed on Feb. 23, 2009, 4 pages.

International Preliminary Report on Patentability received for PCT Patent Application No. PCT/US2005/046288, mailed on Jul. 5, 2007, 13 pages.

International Search Report and Written Opinion received for PCT Application No. PCT/US2005/046288, mailed on Mar. 8, 2006, 19 pages.

Foreign Office Action in relation to European Patent Application No. 05854927.0, mailed on Mar. 17, 2014. 10 pages.

\* cited by examiner

METHOD FOR PROCESSING MULTIMEDIA STREAMS

REFERENCE TO RELATED APPLICATIONS

This application is related to and claims priority of U.S. patent application Ser. No. 11/023,258 filed on Dec. 22, 2004 and entitled, "METHOD FOR PROCESSING MULTIMEDIA STREAMS", which is currently pending. This application is entirely incorporated by reference.

FIELD OF THE INVENTION

The invention is related to processing multimedia streams. More specifically, the invention is related to the intelligent selection of algorithmic processes to process multimedia streams.

BACKGROUND OF THE INVENTION

Interaction with multimedia streams such as during music downloading, video recording, and phone conversations is pervasive in society. The types of electronic devices designed to transmit and receive these streams are as varied as the formats of the streams themselves. If a user of one electronic device sends information to a user of another electronic device the formats need to be compatible for the communication to effectively take place. In many cases, the format that two electronic devices use are not compatible at all, thus an intermediary device must be used to translate the information traveling between the two devices. Devices called transcoders translate a multimedia stream in one format to a stream in another format so people can communicate with each other easily and still use these varied devices and varied multimedia stream formats. Transcoding currently is utilized in a variety of different scenarios such as for one-way, two-way, or multi-way streams.

One-way transcoding is used in circumstances where one device is sending a multimedia stream to a second device. Video messaging and video streaming are examples of one-way transcoding. FIG. 1A describes an example of a transaction that may require one-way transcoding of a multimedia stream. In this example, a video stream 100 is sent from a first computer 102 to a second computer 104. The video from the first computer 102 is encoded into one of many different possible formats including MPEG-2, MPEG-4, GSM (global system for mobile communications), or AMR (adaptive multi-rate) among others. The second computer 104 receives, decodes, and displays the streaming video on a video monitor.

Another example of one-way transcoding would be voicemail. A person may want to record a message on their voicemail system to inform callers that they are out of the office. That person may want to play back the message to determine whether they want to save it or record again. The person could be speaking through a G.711 format phone and the voicemail system may be recording the message in a WAV file. Again, this requires a transcoding step.

Two-way transcoding is used when two devices are sending streams to each other, such as potentially during a video call or an audio (e.g., telephone) call. FIG. 1B describes an example of a two-way video call that may require two-way transcoding of multimedia streams. In this example, a video stream 110 is sent from a first computer 112 to a second computer 114, and also from the second computer 114 to the first computer 110.

Multi-way transcoding is used when more than two devices are sending streams to each other, such as, for example, during a three-party video conference. FIG. 1C describes an example of a three-way video conference that may require multi-way transcoding. In this example, just like the example in FIG. 1B, multiple computers are sending and receiving video streams between each other. In this example, a first computer 122, a second computer 124, and a hand-held mobile computer/cell phone 126 are sending and receiving streams 120 between each other.

In many cases, each of the computers shown in FIGS. 1A, 1B and 1C may encode and decode multimedia streams in different formats. For example, the two computers in FIG. 1C (130 and 132) may encode and decode an MPEG-4 format stream, but the mobile computer/cellular phone 134 may not be capable of encoding or decoding MPEG-4 and instead encodes and decodes only a GSM-format stream. In this case, a transcoding device may be utilized to intercept the streams coming from each of the three devices and translate the streams into each destination device's native format.

A video stream is just one of many possible examples of where a transcoder may be needed. For example, if a person using a land-line phone calls his friend on a cellular phone there is a transcoding step necessary. The standard land-line phones typically operate using a G.711 format. The friend who answers the call would typically have a GSM, AMR, or other cellular phone voice format technology. Thus, in order for the two friends to hear each other a transcoding step would be necessary while they were talking.

The processing power required for many of these transcoding examples varies greatly. In some examples, real-time transcoding is required, in others it isn't. "Real-time" refers to the proximate speed required for a transcoder to transcode and output a multimedia stream at the same rate the untranscoded multimedia stream arrives at the transcoder. Thus, transcoding a voice stream in real-time would require transcoding the voice information at the rate the person is actually speaking the words. Therefore, the two friends who are talking to each other over a land-line and a cellular line must have the formats transcoded in real-time because they are speaking to each other in real-time and a delay in the audio may not be acceptable. The 3-way video conference would require even more processing power because not only are there three streams that need to be transcoded in real-time, but the streams consist of packets with voice and video components, which is a lot more information per packet than just pure voice component packet.

Currently, real-time transcoding systems usually utilize extremely powerful processors, such as servers with dedicated digital signal processors, to make sure that any form of information in the packet can be transcoded in real-time. In many occasions, this amount of processing power is not required. A person who is recording an out-of-office message and then reviews their recordings is not operating in real-time. There is a delay in the range of multiple seconds between when the person speaks into the phone, and when they hear their recorded voice during review.

There are also transcoding systems that perform transcoding in a non-real-time, offline manner. A user on a personal computer may translate a VHS tape into an AVI file to store on a DVD. Finally, there are implementations where no transcoding is done at all, for example, raw video, voice, or audio format streams can be transmitted across a network.

This type of stream is not efficient because raw format streams are uncompressed and require a great deal of network bandwidth.

BRIEF DESCRIPTION OF DRAWINGS

The present invention is illustrated by way of example and is not limited by the figures of the accompanying drawings, in which like references indicate similar elements, and in which.

DETAILED DESCRIPTION

Embodiments of an effective method for processing multimedia streams are disclosed. In the following description, numerous specific details are set forth. However, it is understood that embodiments may be practiced without these specific details. In other instances, well-known elements, applications, and techniques have not been discussed in detail in order to avoid obscuring the present invention.

Figure 1A:
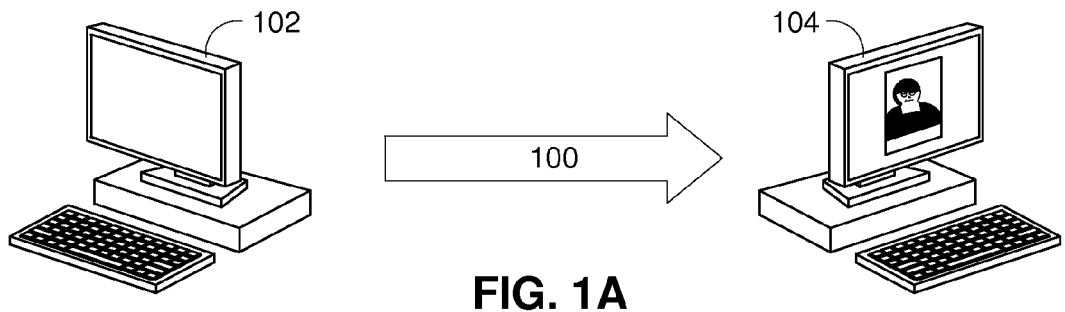
FIG. 1A describes an example of a transaction that may require one-way transcoding of a multimedia stream.
Figure 1B:
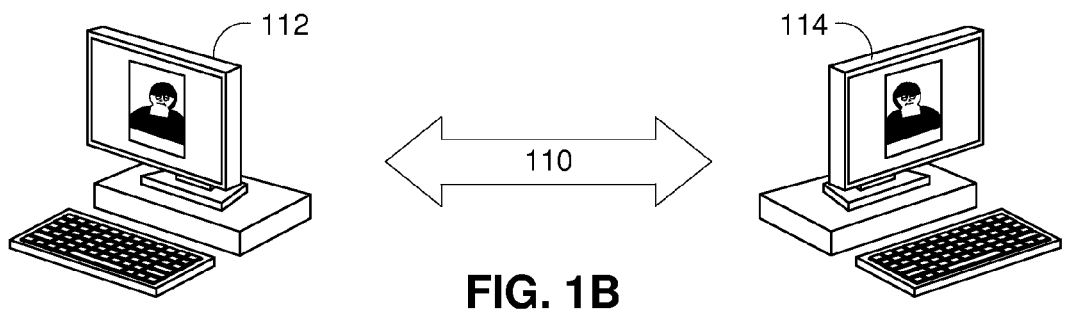
FIG. 1B describes an example of a two-way video call that may require two-way transcoding of multimedia streams.
Figure 1C:
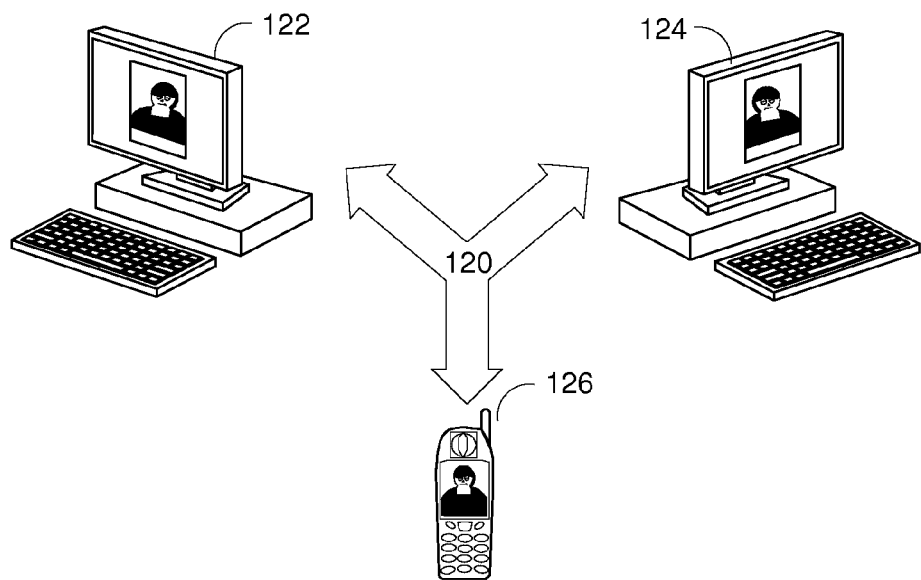
FIG. 1C describes an example of a three-way video conference that may require multi-way transcoding.
Figure 2:
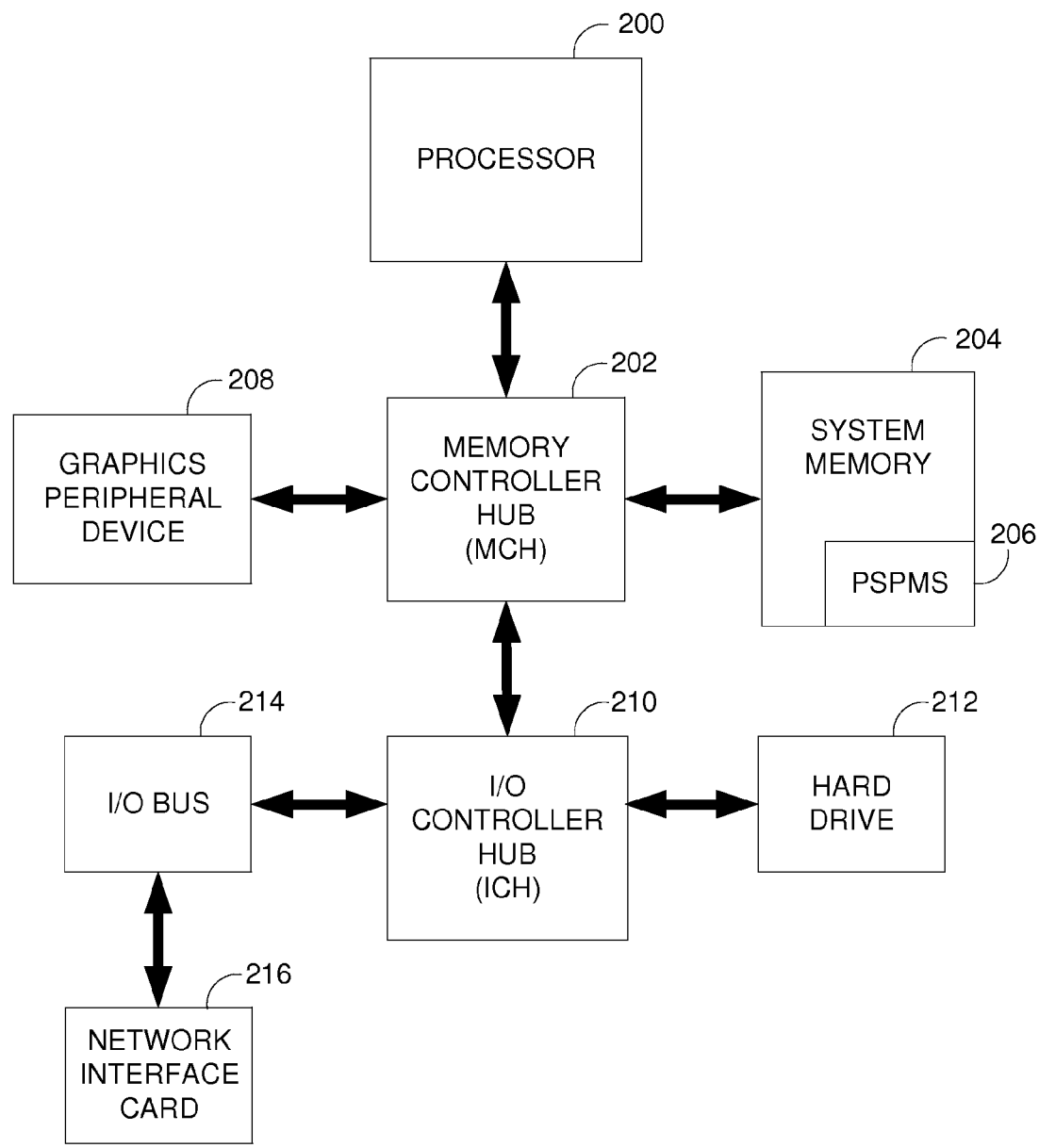
FIG. 2 is a block diagram of one embodiment of a computer system with a multimedia stream processing management system (MSPMS).

FIG. 2 is a block diagram of one embodiment of a computer system with a multimedia stream processing management system (MSPMS). The computer system includes a processor 200, a memory controller hub (MCH) 202, and an I/O controller hub (ICH) 210. The MCH 202 and the ICH 210 comprise a chipset. The processor 200 is coupled to the MCH 202 via a host bus. The MCH 202 is coupled to system memory 204. In different embodiments, system memory may be synchronous dynamic random access memory (SDRAM), double data rate SDRAM (DDR-SDRAM), Rambus DRAM (RDRAM), or one of many other formats of main system memory.

In one embodiment, the computer system includes a MSPMS 206 stored in system memory 204 and operated/executed by the processor 200. In different embodiments, the MSPMS 206 may control a number of management decisions relating to processing a multimedia stream such as the speed the processing requires (e.g., real-time or non-real-time), the priority associated with each of the different components that comprise the stream (e.g., the audio component, the voice component, the video component, the data component, and the control component), and the assignment of the specific device that will actually handle the multimedia stream. In different embodiments, the device that actually handles the multimedia stream may be a digital signal processor, a network server, a remote desktop computer, or the computer system shown in FIG. 2 (including processor 200) among many other possible processing devices.

The MCH 202 is also coupled to a graphics module 208. The ICH 210 is coupled to a hard drive 212 and an I/O bus 214. The I/O bus 214 is coupled to a network interface card that interfaces a network. In different embodiments, the network may be a local area network, a public phone system, the Internet, a wide area network, a wireless network, or any other network that is capable of delivering data between computing devices.

Figure 3:
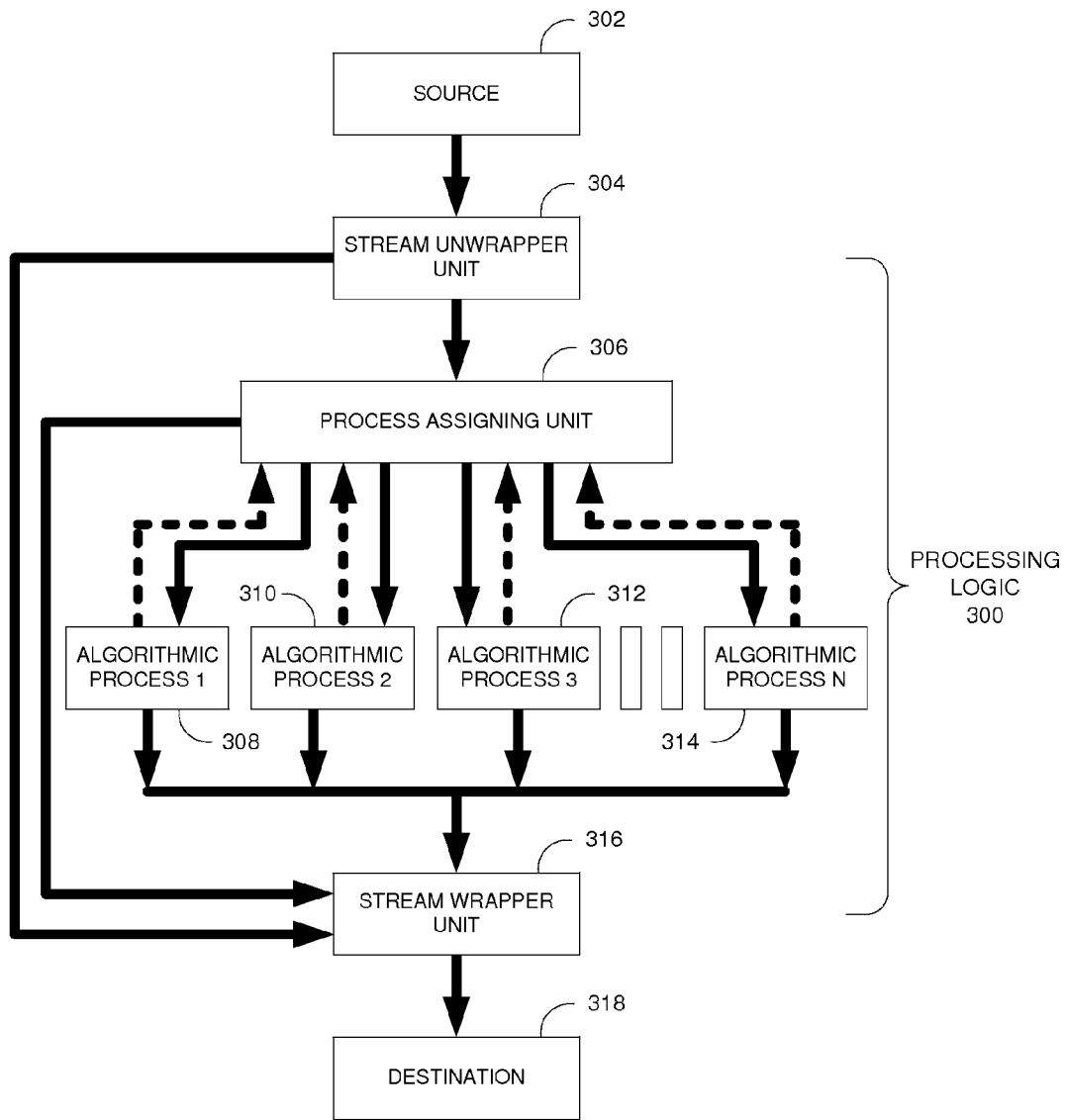
FIG. 3 describes one embodiment of a multimedia stream processing management system (MSPMS).

FIG. 3 describes one embodiment of a multimedia stream processing management system (MSPMS). In this embodiment, the processing logic 300 of the MSPMS is located between a multimedia stream source 302 and a destination 318. The source 302 generates, encodes, and sends a multimedia stream across a network to a destination device 318. The stream is comprised of a number of sequential packets.

Each packet may comprise several components. Each component of the packet consists of a type of information regarding the stream. For example, a packet for an audio/video stream can contain a voice component and a separate video component. In different examples, there may be other components that also make up multimedia streams such as a data component, which sends instructions within the stream, a general audio component, which includes music and background noise information (as opposed to the specific voice information), and a control component, which may include security information, authentication information, and quality of service (QOS) information among other types of control information. Each component within a packet contains a predetermined amount of information for that component. The amount of information per component per packet is usually measured in time. For example, a voice component within an individual packet of a multimedia stream may consist of 100 milliseconds of the recorded voice. Apart from component information, each packet includes a header that contains address information to allow the packet to be routed to the correct destination.

Returning to FIG. 3, if, for example, the source 302 is sending an MPEG-4 format video stream to the destination 318, which requires an MPEG-2 format, then the stream must be transcoded prior to reaching the destination 318. In this embodiment, the MSPMS processing logic 300 intercepts the stream. The stream enters a stream unwrapper unit 304. The stream unwrapper unit 304 unwraps the stream into its individual components. The individual components of the stream are routed to the process assigning unit 306. In the current example, the video component is unwrapped and sent to the process assigning unit 306. In one embodiment, header address information is sent directly from the stream unwrapper unit 304 to the stream wrapper unit 316.

The process assigning unit 306 then assigns each of the one or more stream components to processing logic that includes one or more algorithmic processes (308, 310, 312, 314). An "algorithmic process" is a method or process that is capable of modifying one or more components of a multimedia stream in some way. Examples of algorithmic processes include a method to transcode a component of a multimedia stream, a method to omit certain components of a multimedia stream, a method to delay the processing of a component of a multimedia stream, a method to buffer a real-time transport protocol (RTP) stream, among others.

Many times, to complete a certain task, more than one algorithmic process must be utilized. For example, a user may want to leave a voicemail. The user calls a phone number and a voicemail system answers the call. When the user leaves the message a first algorithmic process may be buffering the actual voice data coming through an RTP stream, a second algorithmic process may be monitoring for a dial tone (dual-tone multi-frequency (DTMF) detection) to detect when any buttons on the phone are pressed during the user message, and a third algorithmic process may be transcoding the RTP stream into a more storage friendly format. In this case, the RTP stream buffer and the DTMF detection algorithmic processes must be operated in real-time to create an effective user interaction, otherwise the voicemail will not be useful, whereas the transcoding process just takes information from the buffer on an available basis. Thus, the RTP and DTMF algorithmic processes may have a higher priority than the transcoding process and the processes are managed by the MSPMS accordingly.

In one embodiment, prioritizing algorithmic processes may be accomplished based on the importance of a component regarding user perception. In the above example, the voicemail user interaction would place a higher priority on functionality to maintain a clear recording of the user's voice. Therefore, buffering an RTP stream is obviously more important than transcoding that stream to a different format because omitting any part of the RTP stream would cause a loss of information and the user's voice would not be audible in part or all of the message. Accordingly, in one embodiment, there are N algorithmic processes, each of which may accomplish the processing of a stream component in a different way. In one embodiment, each algorithmic process prioritizes the processing of components sent to it based on each component's importance. Thus, in this embodiment, if the process assigning unit 306 assigns two or more components to a single algorithmic prioritizing process, the two or more components will be processed in the order of their priority. In different embodiments, the priority may be decided based on an algorithm that takes into account factors such as network transmission rates, relative importance of different components for user comprehensibility of the stream, the bandwidth consumption of the component in relationship to the other components, or any number of other factors.

For example, in a video conference, if the video component is not available, audio communication is still a viable alternative, but if the audio component is not available, the efficiency of the communication drops dramatically with just a video feed. In another example, the video component in a multimedia stream of multi-component packets usually consumes the most bandwidth and computing power, thus, the algorithmic process may be able to just transcode video in real-time, or it may be able to transcode all of the other components in real-time (possibly audio, voice, data, and control components), therefore, four components may have priority over just one. Additionally, if resources are not available to process all components in real-time or even in a delayed (non-real-time) manner, another option is to omit a certain percentage of the lower priority component(s). Thus, if the video component is the lowest priority, the decision may be made by the process assigning unit 306 to assign a component to a particular algorithmic process that only processes every other (or every third, fourth, etc.) packetized component, which would result in a lower frame rate.

In another embodiment, two or more of the N algorithmic processes are running on a single computer system. In this embodiment, each of the two or more components also have their own assigned priority levels. Thus, in one example, if a multimedia stream has a video component and a voice component, each assigned to a separate algorithmic process by the process assigning unit 306, the voice component process may have a higher operating priority in the computer system than the video component process. In this case, if the computer system does not have enough resources to run both processes simultaneously, the video component process will be delayed while the voice component process completes the processing of the voice component of one or more multimedia stream packets. In another embodiment, each of the N algorithmic processes runs on its own thread in the local computer system. In this embodiment, the local computer system may assign each thread a certain priority to correspond with the priorities of the components assigned to each process-thread.

In yet another embodiment, two or more of the N algorithmic processes run on two or more separate computer systems. In this embodiment, the process assigning unit 306 may utilize one or more of the algorithmic processes that run on the computer system with the most available resources. In still yet another embodiment, one component may be assigned to two or more algorithmic processes. In this embodiment, the process assigning unit 306 divides up the information within a single component in the stream into portions and assigns each portion to a separate algorithmic process. In one embodiment, the process assigning unit 306 alternates sending component information between two algorithmic processes on a packet-by-packet level (i.e., a first packet's component is sent to algorithmic process one, a second packet's component is sent to algorithmic process two, a third packet's component is sent to algorithmic process three, etc).

In the current example, the process assigning unit 306 assigns the video component to an algorithmic process to transcode from MPEG-4 to MPEG-2. Once the video component for each packet is processed by the one or more algorithmic processes, the video component (i.e., the new MPEG-2 format video stream) is sent to a stream wrapper unit 316. In one embodiment, the stream wrapper unit 316 will encapsulate the individual components back into a packetized format to be sent to the destination. In one embodiment, the stream wrapper unit 316 will take information directly from the stream unwrapper unit 304 such as the destination address of each component the stream wrapper unit 316 receives as the output of the one or more algorithmic processes. In another embodiment, the stream wrapper unit 316 receives information directly from the process assigning unit 306 such as priority information per component and packet combining information per component. Priority information per component allows the stream wrapper unit 316 to prioritize the wrapping and sending of different components that arrive from one or more of the algorithmic processes. Packet combining information per component allows the stream wrapper unit 316 to incorporate multiple components into a single packet or, alternatively, allow an individual component to be wrapped into a separate packet and sent for a reason such as higher priority.

In the current example, the stream wrapper unit 316 receives the newly transcoded MPEG-2 video component and rewraps the component with the destination address information and any other pertinent information and sends the stream on to the destination 318.

In one embodiment, when deciding which algorithmic process to sign a given component to, the process assigning unit 306 takes into account information including: the network connectivity and throughput of each computer system that an algorithmic process runs on, the amount of free resources that each computer system has available, the priority of each algorithmic process on its respective computer system, among other information. In this embodiment, the process assigning unit 306 receives information regarding each computer system from the algorithmic processes running on each one (the dotted arrows in FIG. 3). With computer system information relating to each algorithmic process, the process assigning unit 306 (and the MSPMS in general) is capable of determining how to process each component in the stream as efficiently as possible to minimize or eliminate any perceived performance degradation of the stream. Thus, as illustrated above, the MSPMS may process a component of a stream in real-time, not in real-time, or not process a component at all depending on the priority of the component and the available system resources.

FIGS. 4 through 9 illustrate multiple examples of MSPMS processing logic decisions regarding the processing of a multimedia stream with a video and a voice component. In these examples the functionality shows that each component in the stream requires transcoding, although, in different embodiments, partial transcoding or no transcoding at all may be allowable for some or all of the video stream. Additionally, processing the components of a stream may include many other functions other than just transcoding such as buffering an RTP stream, DTMF detection, or any one of many other multimedia stream processing functions. Thus, the transcoding examples in FIGS. 4 through 9 are just illustrative examples, which may be substituted for any number of other processes that take place involving a multimedia stream. Furthermore, although the examples are illustrative of a single packet within the stream, the embodiments include repeating the process for potentially all the packets within the stream.

Figure 4:
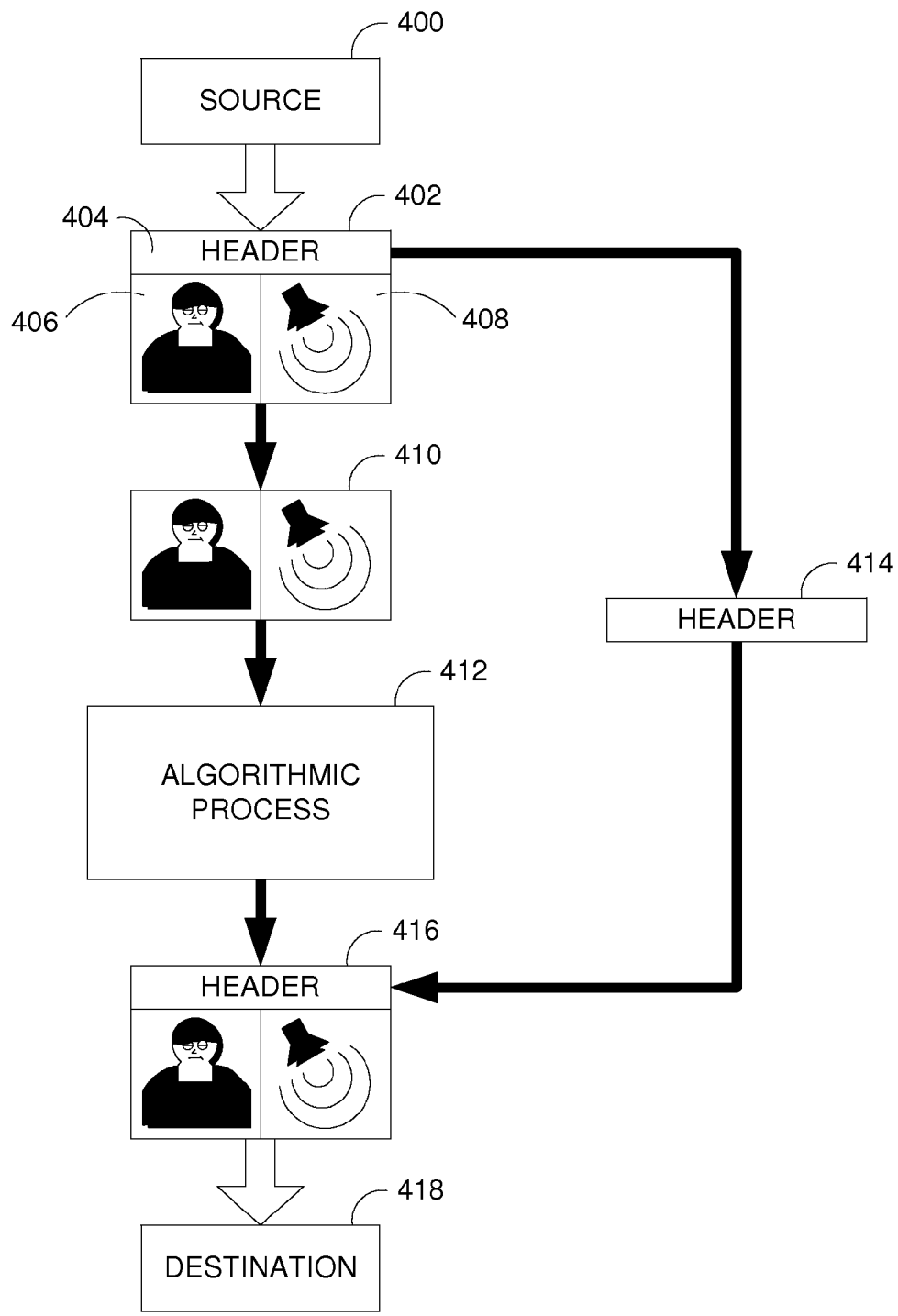
FIG. 4 describes one embodiment of a method to transcode a multimedia stream packet with a single algorithmic process.

FIG. 4 describes one embodiment of a method to transcode a multimedia stream packet with a single algorithmic process. In this embodiment, a source 500 sends a multimedia stream packet 502 across a network. The packet 502 contains a header 504 that has all the routing and address information regarding the packet's destination. In this embodiment, the packet also contains a video component 506 and a voice component 508. In one embodiment, the video component comprises one video frame (i.e., a still image) and the voice component comprises one voice frame (i.e., 100 milliseconds of voice information). In one embodiment, the header 404 is removed and a packet 410 containing only the video and voice component is sent to the algorithmic process 412. The algorithmic process 412 transcodes the information in each component and outputs a new packet containing only transcoded video and voice components. The header 404 bypasses 414 the algorithmic process and may be reattached to the transcoded packet to create a new packet 416, which is sent to the destination 418. In this embodiment, the single algorithmic process 412 is capable of transcoding (in real-time) a multimedia stream of packets that have video and voice components. In one embodiment, the header 404 is modified by the stream wrapper unit (FIG. 3, 316) based on information provided from the stream unwrapper unit (FIG. 3, 304) and the process assigning unit (FIG. 3, 306). In another embodiment, the header 404 is not removed from the packet and the packet is sent to the algorithmic process with the header 404 intact.

Figure 5:
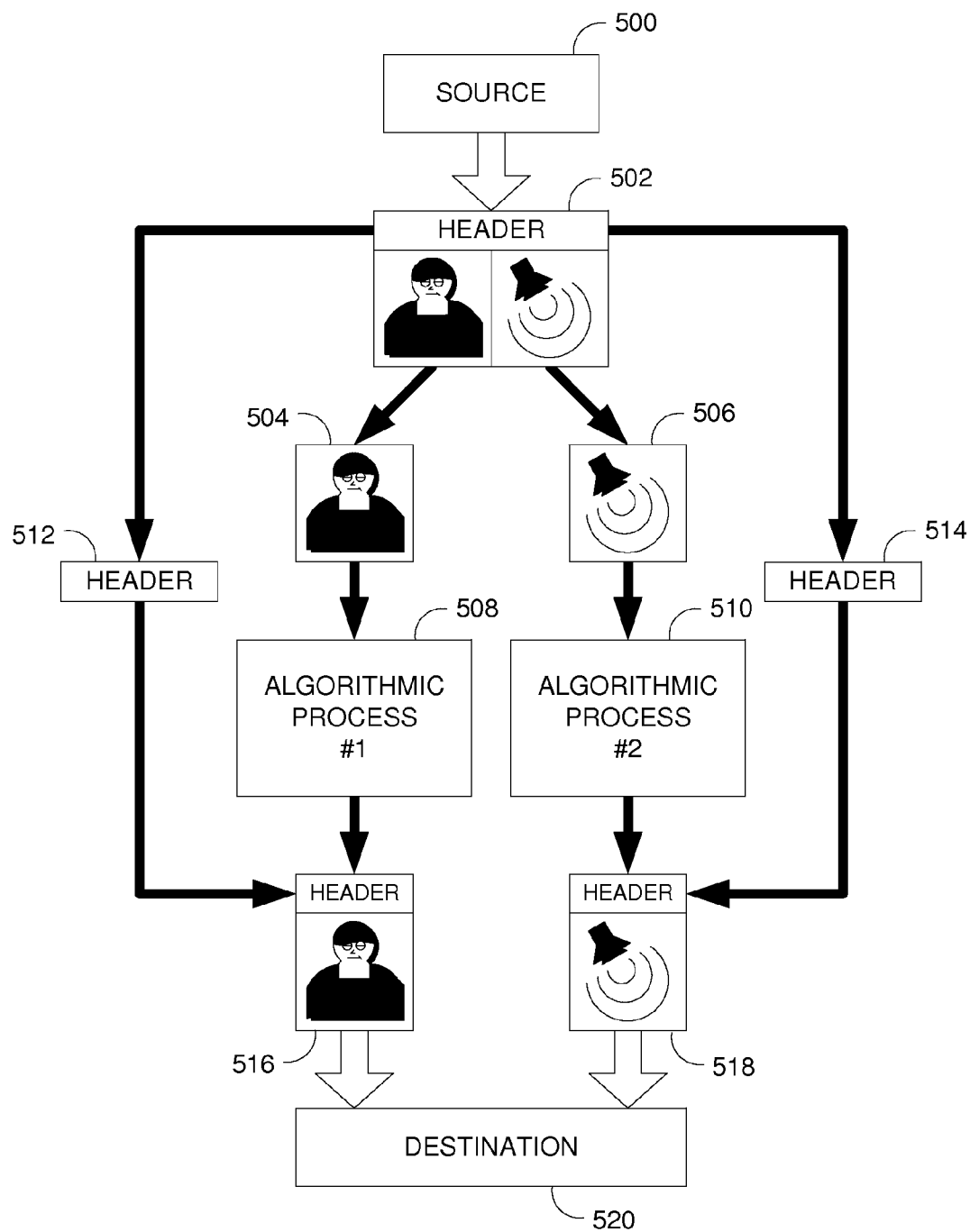
FIG. 5 describes an embodiment of a method to transcode a multimedia stream packet with multiple algorithmic processes.

FIG. 5 describes an embodiment of a method to transcode a multimedia stream packet with multiple algorithmic processes. In this embodiment, a source 500 sends a multimedia stream packet 502 across a network. The packet 502 contains a video component, and a voice component (as described above in FIG. 4). In one embodiment, the header is removed and different components within the packet are also separated. The video component 504 is sent to algorithmic process #1 (508) for video transcoding and the voice component 506 is sent to algorithmic process #2 (510) for voice transcoding. In different embodiments, algorithmic processes #1 (508) and #2 (510) may be located on the same computing device or on different computing devices. When algorithmic processes #1 (508) and #2 (510) complete their respective video and voice component transcoding, the header, which bypassed the transcoding process (512 and 514) may be reattached to separate transcoded video and voice component packets (516 and 518). The video component packet 516 and voice component packet 518 arrive separately at the destination 520. In one embodiment, the header is modified by the stream wrapper unit (FIG. 3, 316) based on information provided from the stream unwrapper unit (FIG. 3, 304) and the process assigning unit (FIG. 3, 306). In another embodiment, the header is not removed from the packet and the packet is sent to the algorithmic process with the header intact. Thus, the algorithmic process itself may modify the header.

Figure 6:
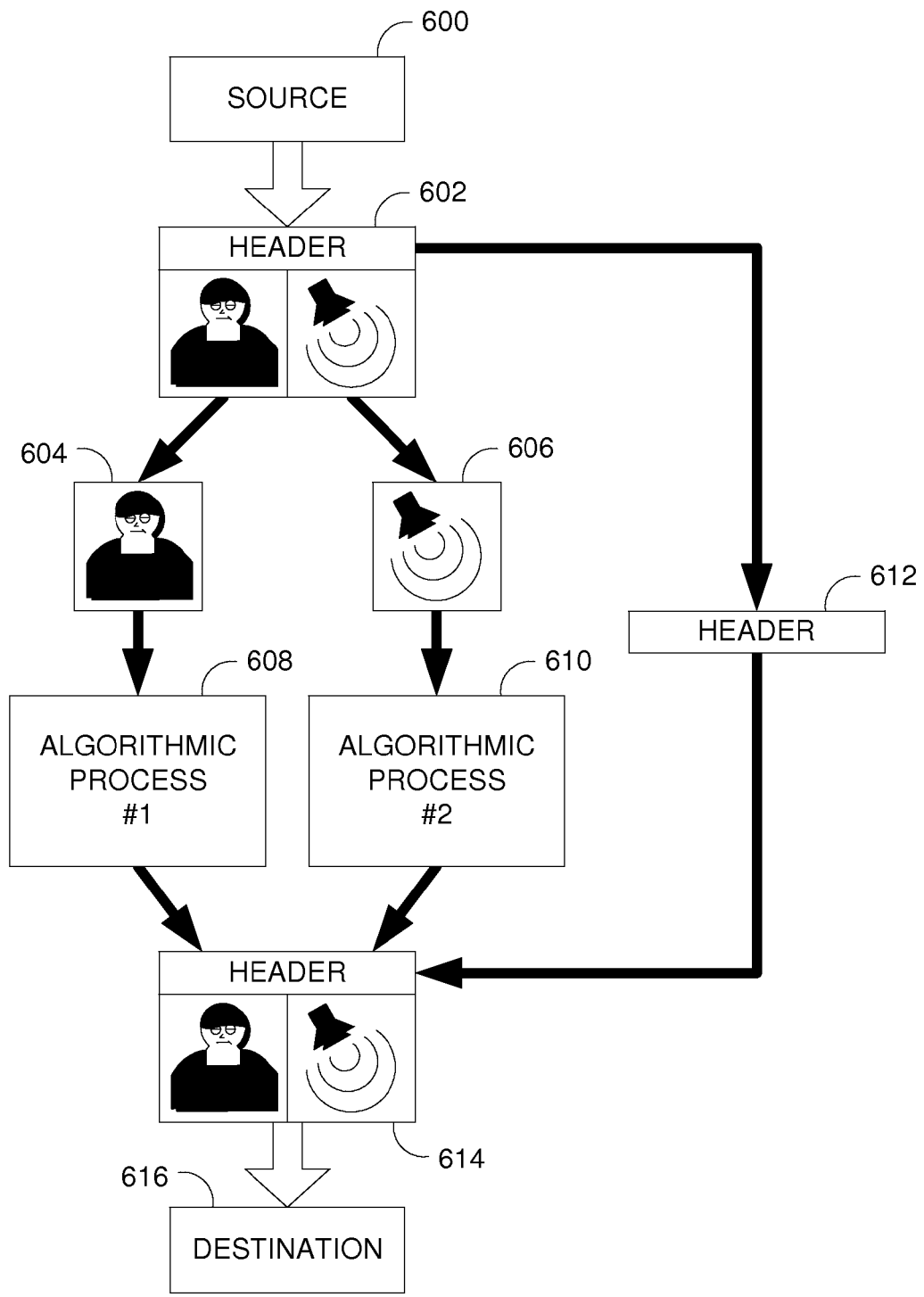
FIG. 6 describes another embodiment of a method to transcode a multimedia stream packet with multiple algorithmic processes.

FIG. 6 describes another embodiment of a method to transcode a multimedia stream packet with multiple algorithmic processes. In this embodiment, a source 600 sends a multimedia stream packet 602 across a network. The packet 602 contains a video component and a voice component (as described above in FIG. 4). The header is removed and different components within the packet are also separated. The video component 604 is sent to algorithmic process #1 (608) for video transcoding and the voice component 606 is sent to algorithmic process #2 (610) for voice transcoding. When algorithmic processes #1 (608) and #2 (610) complete their respective video and voice component transcoding they reattach the video component and the voice component into one multi-component packet 614. The header, which bypassed the transcoding process may be reattached to the multi-component packet 614 and the packet is sent to the destination 616. In this embodiment, if either transcoded component packet must wait more than a pre-determined amount of time for a corresponding packet from the other algorithmic process, the packet 614 is sent to the destination by the stream wrapper unit (FIG. 3, 316) with just one component to minimize any bottleneck in the algorithmic process that finished first. In one embodiment, the header is modified by the stream wrapper unit (FIG. 3, 316) based on information provided from the stream unwrapper unit (FIG. 3, 304) and the process assigning unit (FIG. 3, 306). In another embodiment, the header is not removed from the packet and the packet is sent to the algorithmic process with the header intact. Thus, the algorithmic process itself may modify the header.

Figure 7:
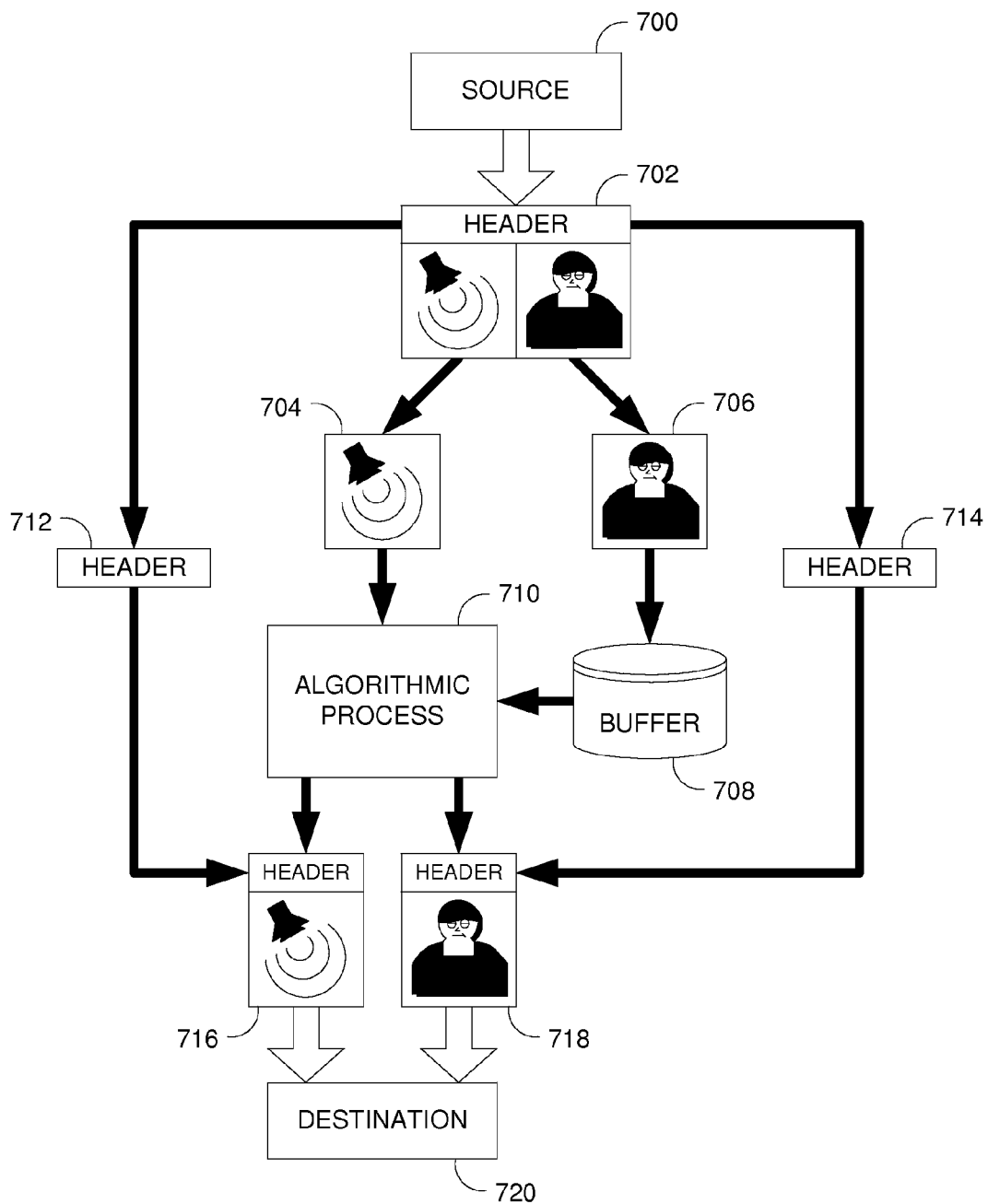
FIG. 7 describes an embodiment of a method to transcode a multimedia stream packet with one algorithmic process and one buffer.

FIG. 7 describes an embodiment of a method to transcode a multimedia stream packet with one algorithmic process and one buffer. In this embodiment, a source 700 sends a multimedia stream packet 702 across a network. The packet 702 contains a video component and a voice component (as described above in FIG. 4). The header is removed and different components within the packet are also separated. In this embodiment, the voice component 704 has priority over the video component 706, thus the voice component 704 is sent directly to the algorithmic process 710 while the video component 706 is sent to a buffer 708 to wait for the algorithmic process 710 to finish transcoding the voice component 704. Once the voice component 704 transcoding process has finished, the buffer 708 releases the stored video component 706 to the algorithmic process 710 for transcoding. Once a voice component or video component has finished being transcoded, the transcoded component is reattached to the header (712 or 714) and the individual video or voice component packet (716 or 718) is sent to the destination 720. In one embodiment, the header is modified by the stream wrapper unit (FIG. 3, 316) based on information provided from the stream unwrapper unit (FIG. 3, 304) and the process assigning unit (FIG. 3, 306). In another embodiment, the header is not removed from the packet and the packet is sent to the algorithmic process with the header intact. Thus, the algorithmic process itself may modify the header.

Figure 8:
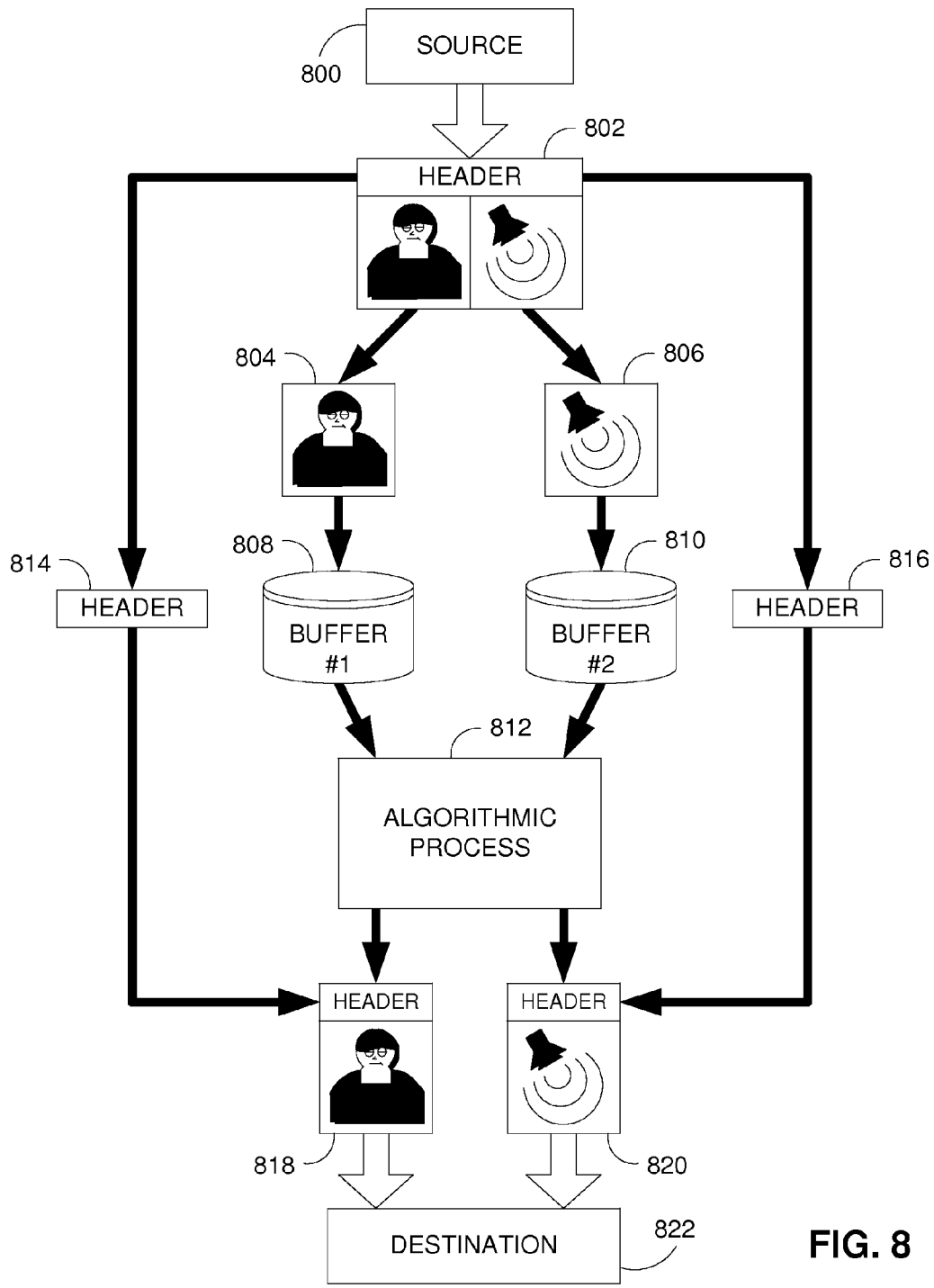
FIG. 8 describes an embodiment of a method to transcode a multimedia stream packet with one algorithmic process and multiple buffers.

FIG. 8 describes an embodiment of a method to transcode a multimedia stream packet with one algorithmic process and multiple buffers. In this embodiment, a source 800 sends a multimedia stream packet 802 across a network. The packet 802 contains a video component and a voice component (as described above in FIG. 4). The header is removed and different components within the packet are also separated. In this embodiment, there is only one algorithmic process 812. Additionally, the priority of the components may be changed in real-time based on certain circumstances. In this case, the priority of the video component and the priority of the voice component may increase or decrease relative to each other during transcoding operations. Thus, two buffers are utilized to allow for either component to have the capability of waiting for the algorithmic process 812 to finish transcoding the other component.

In this embodiment, the video component 804 is sent to buffer #1 (808) and the voice component 806 is sent to buffer #2 (810). In this embodiment, the algorithmic process 812 takes a single component one at a time from either buffer #1 (808) or buffer #2 (810). The determination of which buffer to take from depends on the priority assigned to the individual component waiting in each buffer. Once the algorithmic process 812 finishes transcoding an individual component, the transcoded component is reattached to the header (814 or 816) and the individual video or voice component packet (818 or 820) is sent to the destination 822.

In one embodiment, the header is modified by the stream wrapper unit (FIG. 3, 316) based on information provided from the stream unwrapper unit (FIG. 3, 304) and the process assigning unit (FIG. 3, 306). In another embodiment, the header is not removed from the packet and the packet is sent to the algorithmic process with the header intact. Thus, the algorithmic process itself may modify the header.

Figure 9:
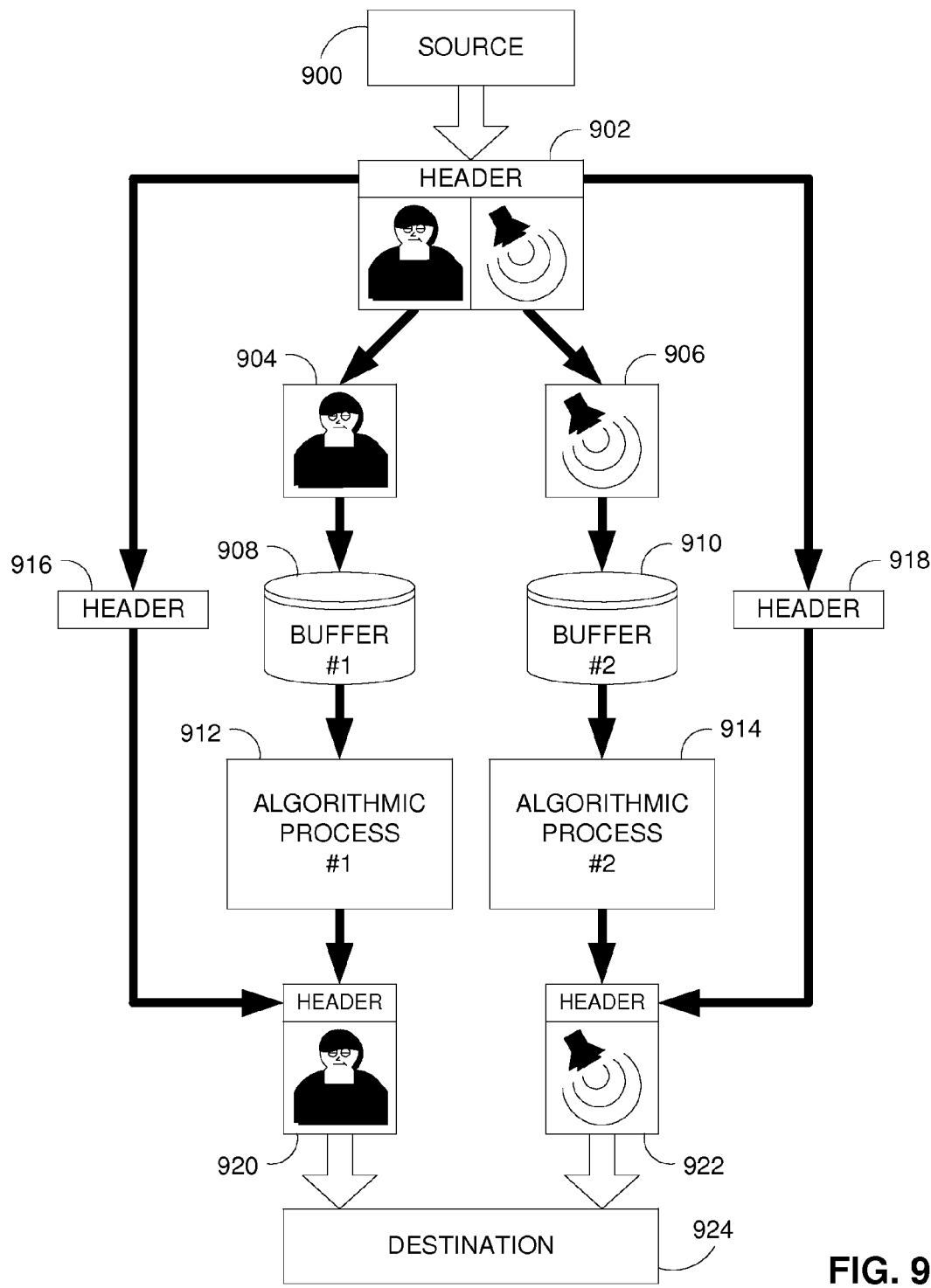
FIG. 9 describes an embodiment of a method to transcode a multimedia stream packet with multiple algorithmic processes and multiple buffers.

FIG. 9 describes an embodiment of a method to transcode a multimedia stream packet with multiple algorithmic processes and multiple buffers. In this embodiment, a source 900 sends a multimedia stream packet 902 across a network. The packet 902 contains a video component and a voice component (as described above in FIG. 5). The header is removed and different components within the packet are also separated. In this embodiment, there are two algorithmic processes (912 and 914). Additionally, the priority of the components may be changed in real-time based on certain circumstances. In one embodiment, algorithmic processes #1 (912) and #2 (914) are located on the same computer system, but in separate processes. In this case, the priority of the video transcoding process and the priority of the voice transcoding process may increase or decrease relative not only to each other, but also to other processes running on the computer system.

For example, the computer system that both algorithmic processes reside on receives a worm from the Internet and a process that runs a virus protection software program temporarily takes a higher priority than either the video transcoding algorithmic process or the voice transcoding algorithmic process. Thus, in this case, each algorithmic process has its own buffer to allow for both components to have the capability of waiting for the algorithmic processes (912 and 914) to regain the high priority on the system.

In this embodiment, the video component 904 is sent to buffer #1 (908) and the voice component 906 is sent to buffer #2 (910). In this embodiment, algorithmic process #1 (912) takes individual video components from buffer #1 (908) and algorithmic process #2 (914) takes individual voice components from buffer #2 (910). Once either algorithmic process finishes transcoding an individual component, the transcoded component is reattached to its header (916 or 918) and the individual video or voice component packet (920 or 922) is sent to the destination 924.

In one embodiment, the header is modified by the stream wrapper unit (FIG. 3, 316) based on information provided from the stream unwrapper unit (FIG. 3, 304) and the process assigning unit (FIG. 3, 306). In another embodiment, the header is not removed from the packet and the packet is sent to the algorithmic process with the header intact. Thus, the algorithmic process itself may modify the header.

Figure 10:
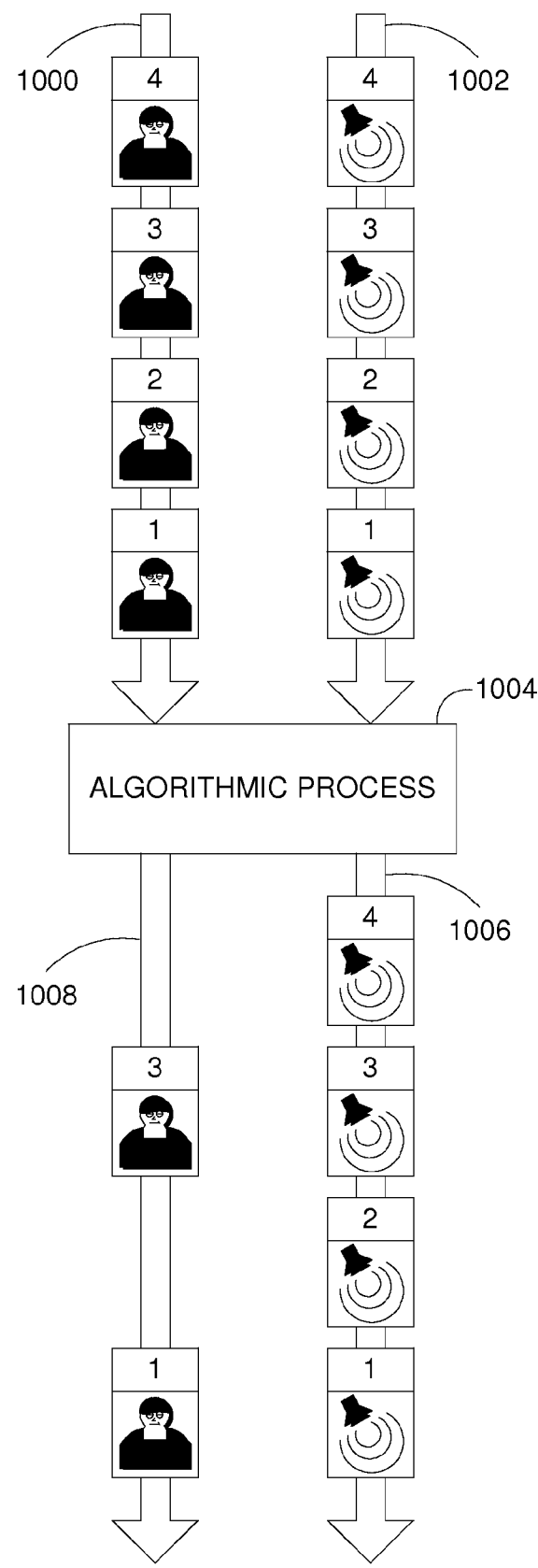
FIG. 10 describes one embodiment of an algorithmic process omitting individual components based on component priority and processing power limitations.

FIG. 10 describes one embodiment of an algorithmic process omitting individual components based on component priority and processing power limitations. In this embodiment, a stream of video components 1000 (i.e., video frames) and a stream of voice components 1002 (i.e. voice frames) is input into a algorithmic process 1004. Thus, the algorithmic process 1004 in this embodiment is similar to the algorithmic process described in FIG. 8. In this embodiment, the algorithmic process 1004 does not have the processing power to keep up with every voice frame and every video frame. Thus, if there are no other systems with algorithmic processes capable of taking some of the transcoding work, certain frames must be omitted to maintain the real-time nature of the stream.

In the case that the voice component has a higher transcoding priority than the video component, certain frames of video must be omitted (i.e., dropped). Therefore, in one embodiment, a stream of four video frames 1000 and a stream of four voice frames 1002 are input into the algorithmic process 1004. The algorithmic process 1004 transcodes all voice frames and sends them out in order in the voice output stream 1006. The algorithmic process 1004 also uses its remaining processing power to transcode as many video frames as possible and sends them out in order in the video output stream 1008. In this case, the algorithmic process 1004 is omitting every other video frame to maintain the real-time aspect of the streams. Consequently, the voice stream is clear and intact, and the video stream has its frame rate cut in half.

Figure 11:
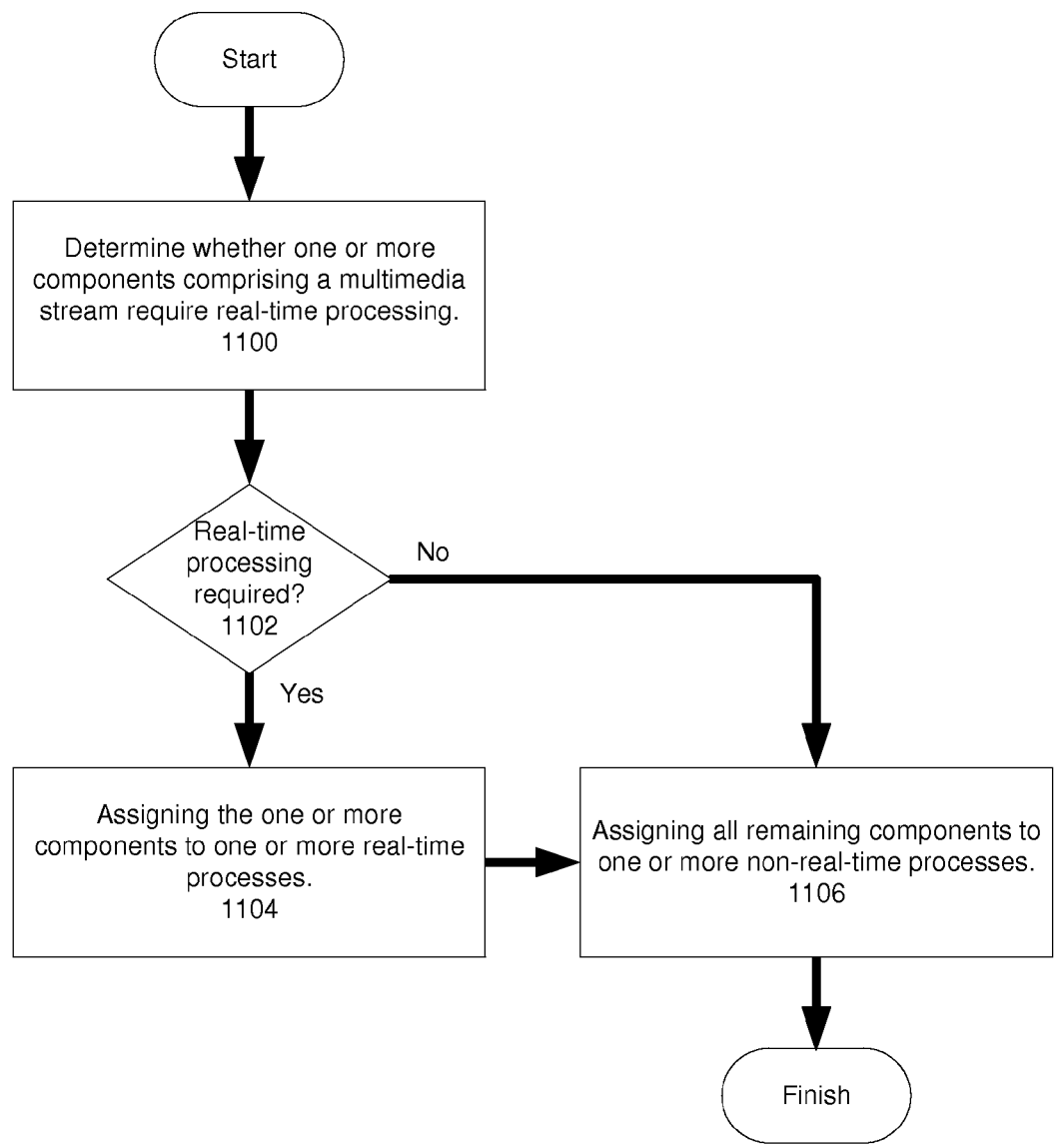
FIG. 11 is a flow diagram of an embodiment of a method for assigning components of a multimedia stream to real-time and non-real-time algorithmic processes.

FIG. 11 is a flow diagram of an embodiment of a method for assigning components of a multimedia stream to real-time and non-real-time algorithmic processes. The method is performed by processing logic that may comprise hardware (circuitry, dedicated logic, etc.), software (such as is run on a general purpose computer system or a dedicated machine), or a combination of both. Referring to FIG. 11, the method begins by processing logic determining whether one or more components comprising a multimedia stream require real-time processing (block 1100). If processing logic determines that real-time processing is required (block 1102) then processing logic assigns the one or more components that require real-time processing to one or more real-time algorithmic processes (block 1104). Finally, processing logic assigns any remaining components to one or more non-real-time algorithmic processes (block 1106) and the method is finished.

Figure 12:
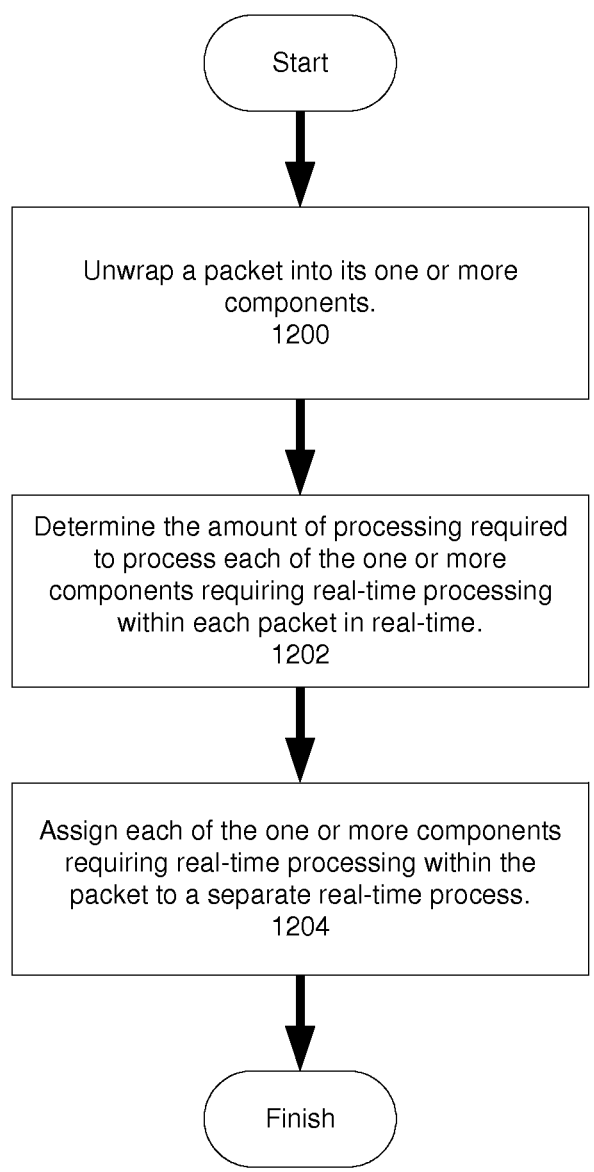
FIG. 12 is a flow diagram of another embodiment of a method for assigning components of a multimedia stream to real-time processes.

FIG. 12 is a flow diagram of another embodiment of a method for assigning components of a multimedia stream to real-time processes. The method is performed by processing logic that may comprise hardware (circuitry, dedicated logic, etc.), software (such as is run on a general purpose computer system or a dedicated machine), or a combination of both. Referring to FIG. 12, the method begins by processing logic unwrapping a packet into its one or more components (block 1200). Next, processing logic determines the amount of processing required to process each of the one or more components requiring real-time processing within each packet in real-time (block 1202). Finally, processing logic assigns each of the one or more components requiring real-time processing within the packet to a separate real-time process (block 1204) and the method is finished.

Figure 13:
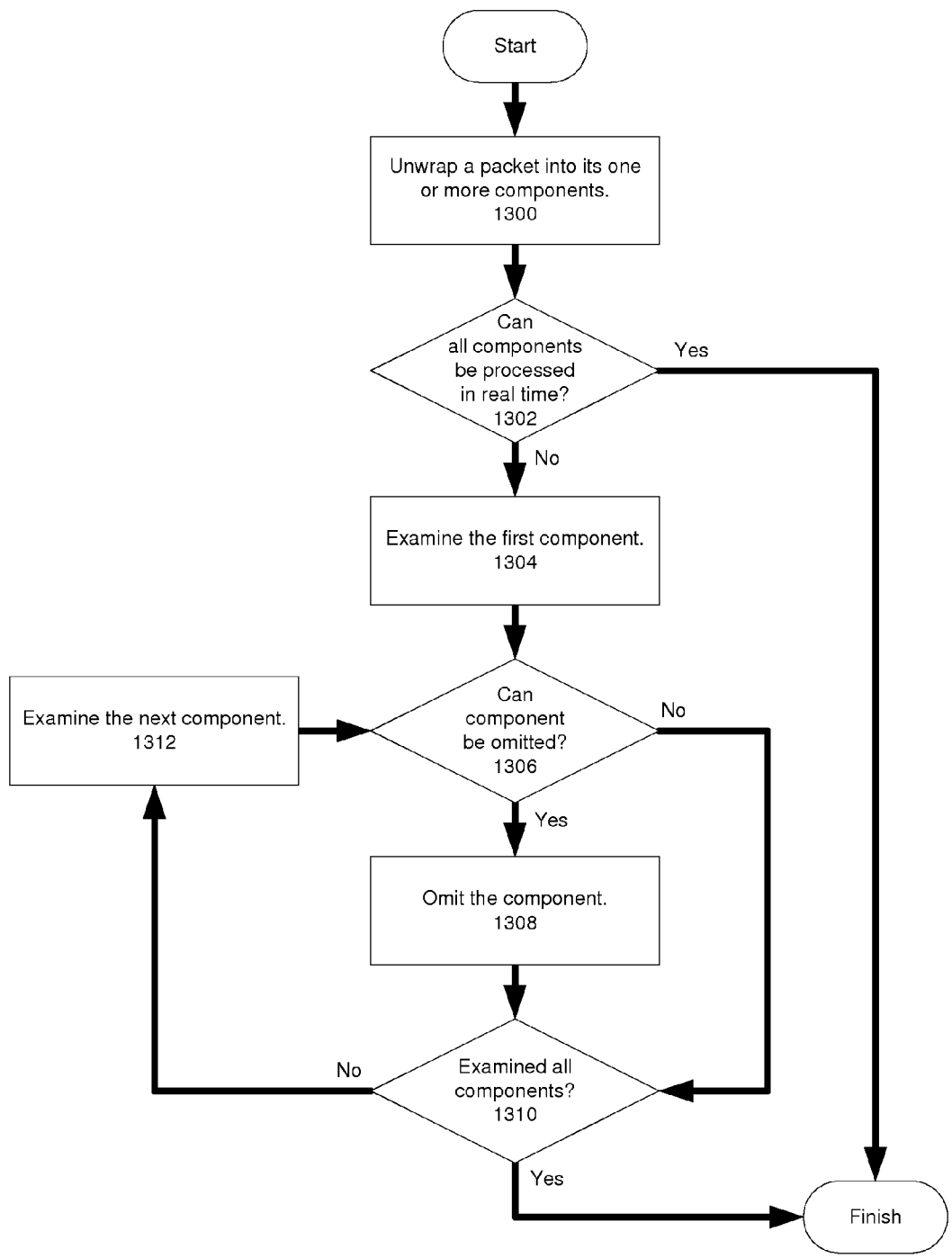
FIG. 13 is a flow diagram of an embodiment of a method for omitting components of a multimedia stream from the transcoding process.

FIG. 13 is a flow diagram of an embodiment of a method for omitting components of a multimedia stream from the transcoding process. The method is performed by processing logic that may comprise hardware (circuitry, dedicated logic, etc.), software (such as is run on a general purpose computer system or a dedicated machine), or a combination of both. Referring to FIG. 13, the method begins by processing logic unwraps a packet into its one or more components (block 1300). Next, processing logic determines if all components of the unwrapped packet can be transcoded in real-time (block 1302). If they can then the method is finished. Otherwise, processing logic examines the first component (block 1304). Once the component is examined, processing logic determines if the component can be omitted (block 1306).

The determination whether a component can be omitted may be made based on a number of factors such as the processing priority of the component and the number of consecutive component frames that have been omitted. For example, as discussed in FIG. 10, if the algorithmic process does not have the processing power to process everything in real-time a decision must be made as to which components to omit and when to omit them. Dropping a video component down to half its standard frame rate by omitting every other frame is less objectionable than to drop 15 frames in a row and then transcode 15 frames in a row. The end result is the same number of frames, but the quality of the viewing experience is different for those two separate options.

Returning to FIG. 13, if the component can be omitted then processing logic omits the component (block 1308). Next, processing logic determines whether all components have been examined (block 1310). If so, the method is finished. Otherwise, processing logic examines the next component (block 1312). Eventually, all components of an unwrapped packet will be examined and the method will finish. In another embodiment, determining whether to omit one or more components from a stream may include a decision regarding multimedia stream processes other than just transcoding. Thus, transcoding is used as an example and can be substituted with one or more other functions that may be performed on a multimedia stream.

Figure 14:
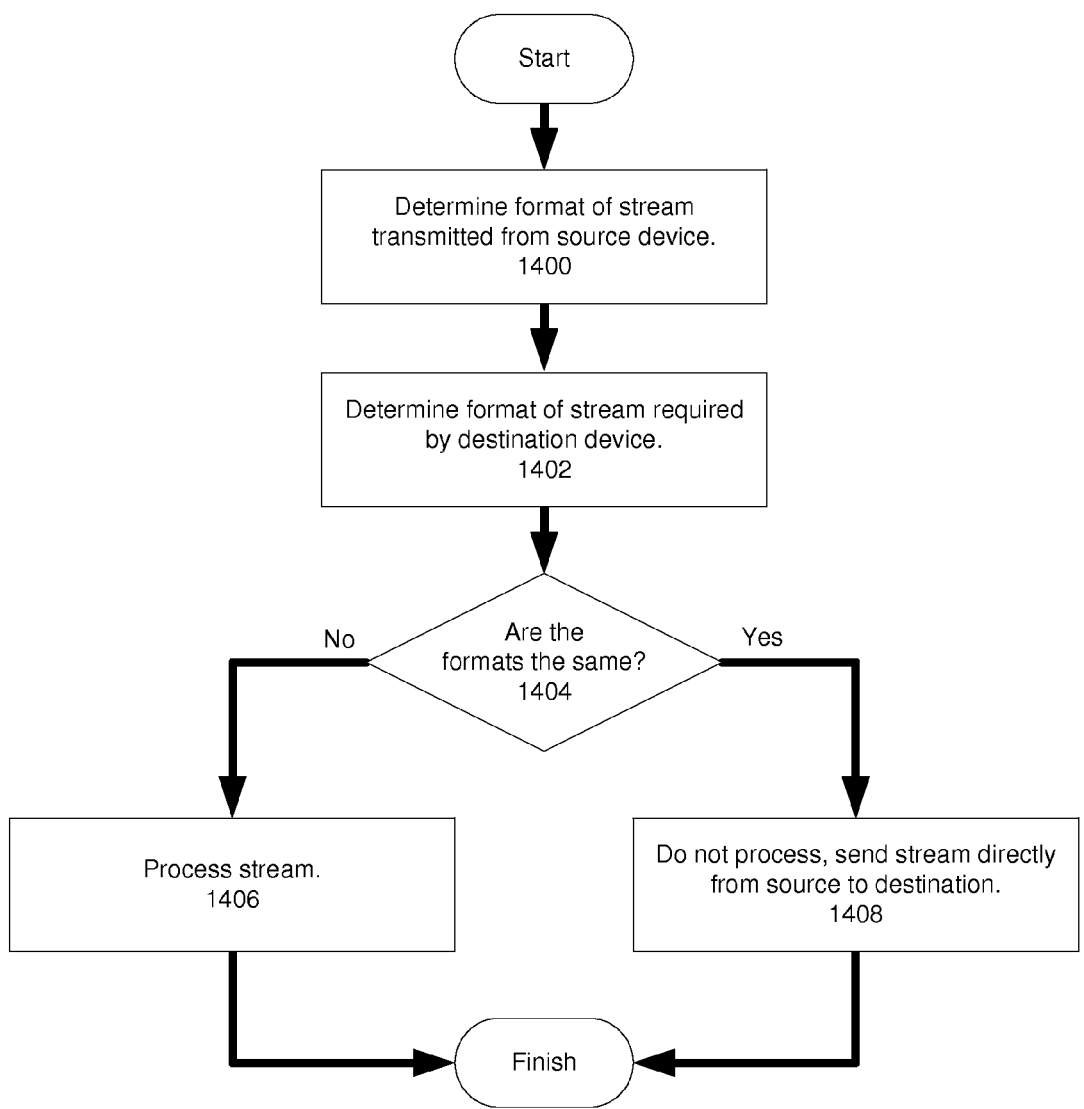
FIG. 14 is a flow diagram of an embodiment of a method to skip the transcoding of a stream.

FIG. 14 is a flow diagram of an embodiment of a method to skip the transcoding of a stream. The method is performed by processing logic that may comprise hardware (circuitry, dedicated logic, etc.), software (such as is run on a general purpose computer system or a dedicated machine), or a combination of both. Referring to FIG. 14, the method begins by processing logic determining the format of the stream transmitted from the source device (block 1500). Next, processing logic determines the format of the stream required by the destination device (block 1502). Next, processing logic determines whether the two formats are the same (block 1504). If the formats are not the same, processing logic transcodes the stream (block 1506) and the process is finished. Otherwise, if the formats are the same, processing logic does not transcode the stream and instead sends the stream directly from the source to the destination (block 1508) and the method is finished.

Figure 15:
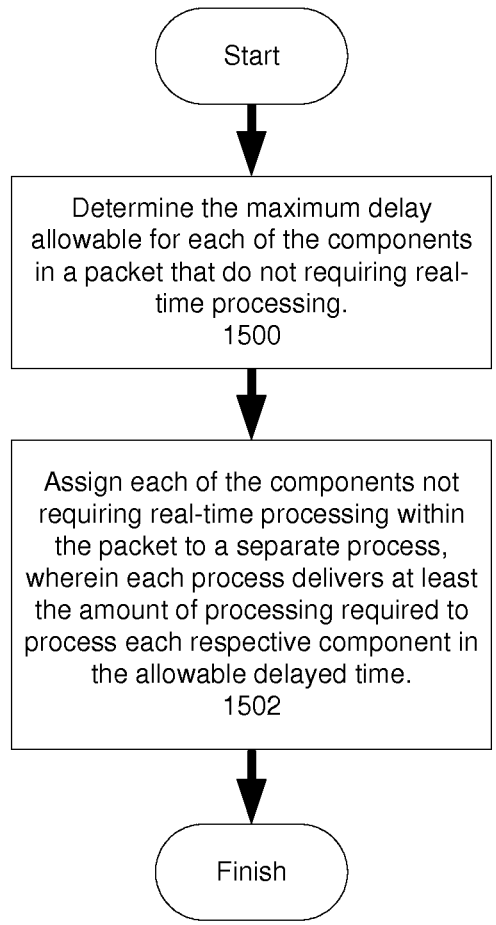
FIG. 15 is a flow diagram of an embodiment of a method for assigning components of a multimedia stream that do not require real-time processing, but require processing before a determined maximum time delay, to processes that are able to process within the determined maximum time delay.

FIG. 15 is a flow diagram of an embodiment of a method for assigning components of a multimedia stream that do not require real-time processing, but require processing before a determined maximum time delay, to processes that are able to process within the determined maximum time delay. The method is performed by processing logic that may comprise hardware (circuitry, dedicated logic, etc.), software (such as is run on a general purpose computer system or a dedicated machine), or a combination of both. Referring to FIG. 15, the method begins by processing logic determining the maximum delay allowable for each of the components in a packet that do not require real-time processing (block 1500). In different embodiments, a determination of the maximum allowable processing delay may be made based on a number of factors including the type of transaction the multimedia stream is being used for, the speed of the transmission medium (e.g. the required speed of processing a voicemail attached in an email is limited to the inherent delay of emails), as well as numerous other factors. Next, processing logic assigns each of the components not requiring real-time processing to a separate process, wherein each process delivers at least the amount of processing required to process each respective component in the allowable delayed time (block 1502) and the method is finished.

In many of the preceding example embodiments, the packets dealt with mainly video and voice components. In other embodiments, the packets contain any one or more of video, audio, voice, data, control, or any other conceivable packet type. Additionally, the example embodiments referenced packets that included only two components. In other embodiments, the packets may contain any conceivable number of components (i.e., greater than or equal to one component). Finally, in many example embodiments a single algorithmic process was responsible for processing all components of a single type. In other embodiments, more than one algorithmic process may be assigned to a single type of component. Thus, in many embodiments, two or more algorithmic processes can trade off processing duties and each algorithmic process can therefore process every other packetized component of a single type (or every third, fourth, etc.).

Thus, embodiments for an effective method for processing multimedia streams are disclosed. These embodiments have been described with reference to specific exemplary embodiments thereof. It will, however, be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

The invention claimed is:

1. A device, comprising a hardware processor and computer logic to direct the hardware processor to:
   read a first packet via the hardware processor, wherein the first packet is one of a plurality of packets comprising a multimedia packet stream, wherein the first packet comprises a plurality of components including a video component and an audio component;
   for each component of the plurality of components within the first packet:
      assign a priority level to the component based on importance of the component's information;
      determine, via the hardware processor, whether the component requires real-time-processing;
      assign, via the hardware processor, the component to be processed by a real-time process in response to the component requiring real-time processing;
      assign, via the hardware processor, the component to be processed by a non-real-time process in response to the component not requiring real-time processing; and
   if a packet processing time exceeds a specified amount of time for any component, omit the component, otherwise:
      generate a second packet that includes the video component;
      generate a third packet that includes the audio component; and
      send the second packet and the third packet to a destination;
   wherein the plurality of components are processed sequentially in the order of the priority levels per component, a highest priority level component being processed first and a lowest priority level component being processed last.

2. The device of claim 1, wherein the computer logic is further operable to direct the hardware processor to
   determine a rate at which the plurality of packets are being received; and
   process each component within each packet at least at the rate the packets are being received.

3. The device of claim 1, wherein the computer logic is further operable to direct the hardware processor to
   unwrap the first packet by separating each of the plurality of components comprising the first packet.

4. The device of claim 1, wherein the computer logic is further operable to direct the hardware processor to
   determine a maximum delay allowable for a first component not requiring real-time processing; and
   assign the first component to a process that delivers at least the amount of processing required to process the first component within the maximum allowable delay.

5. The device of claim 1, wherein the computer logic is further operable to direct the hardware processor to
   store the stream of packets in real-time on a storage device immediately after packet creation to prevent information loss of one or more low priority level packet components.

6. The device of claim 1, wherein the computer logic is further operable to direct the hardware processor to:
   omit at least one component of the first packet from being processed.

7. The device of claim 1, wherein the computer logic is further operable to direct the hardware processor to:
   omit a component of the first packet with the lowest priority level from being processed.

8. The device of claim 7, wherein the computer logic is further operable to direct the hardware processor to
   set a maximum number of consecutive packets in the stream with the same omitted component.

9. The device of claim 1, wherein the computer logic is further operable to direct the hardware processor to:
   determine a first format of the packets in the stream transmitted from a source device;
   determine a second format of the packets in the stream required by a destination device;
   cause each packet within the stream to directly transmit between the source device and the destination device without processing in response to the first and second formats being equal.

10. The device of claim 1, wherein a process comprises an executable thread on a computing device including the hardware processor.

11. The device of claim 1, wherein the computer logic is further operable to direct the hardware processor to
   assign at least two of the plurality of components within each packet to processes on separate computing devices.

12. The device of claim 1, wherein the computer logic is further operable to direct the hardware processor to
   assign two or more of the plurality of components to the same process.

13. A device, comprising a hardware processor and computer logic to direct the hardware processor to:
   receive a first packet of a multimedia packet stream, the first packet comprising a plurality of components including a video component, an audio component, and packet header information;
   assign a priority level to each of the plurality of components based on importance of the component's information;
   assign the video component to be processed by a first real-time process to generate a processed video component;
   assign the audio component to be processed by a second real-time process to generate a processed audio component;
   combine the processed audio component and the packet header information to generate a second packet;

if the processed video component is not available within a specified amount of time, then discard the video component, otherwise add the processed video component to the second packet; and send the second packet to a destination;

wherein the plurality of components are processed sequentially in the order of the priority levels per component, a highest priority level component being processed first and a lowest priority level component being processed last.

* * * * *